United States Patent
Vilk et al.

(10) Patent No.: US 8,931,866 B2
(45) Date of Patent: Jan. 13, 2015

(54) GENERATING CONTROL DATA TO PRINT A FRAME PORTION AND AN INTRA-FRAME PORTION

(75) Inventors: Ran Vilk, Qiryat Ono (IL); Yair Shemesh, Holon (IL)

(73) Assignee: Hewlett-Packard Industrial Printing Ltd., Netanya (IL)

( * ) Notice: Subject to any disclaimer, the term of this patent is extended or adjusted under 35 U.S.C. 154(b) by 259 days.

(21) Appl. No.: 13/349,911

(22) Filed: Jan. 13, 2012

(65) Prior Publication Data

US 2013/0182021 A1 Jul. 18, 2013

(51) Int. Cl.
*B41J 29/38* (2006.01)

(52) U.S. Cl.
USPC ............................................................ 347/5

(58) Field of Classification Search
None
See application file for complete search history.

(56) References Cited

U.S. PATENT DOCUMENTS

| | | | |
|---|---|---|---|
| 5,907,666 A * | 5/1999 | Yano et al. ...................... | 358/1.9 |
| 6,799,823 B2 | 10/2004 | Miquel et al. | |
| 7,874,663 B2 | 1/2011 | Makuta et al. | |
| 2007/0060670 A1 | 3/2007 | Ellis | |
| 2007/0188535 A1 | 8/2007 | Elwakil et al. | |
| 2009/0079777 A1* | 3/2009 | Nagamura et al. .............. | 347/15 |

FOREIGN PATENT DOCUMENTS

| JP | 2005153314 A | * | 6/2005 | ................ | B41J 2/01 |
|---|---|---|---|---|---|
| JP | 2008080711 | | 4/2008 | | |

* cited by examiner

*Primary Examiner* — Geoffrey Mruk
*Assistant Examiner* — Bradley Thies
(74) *Attorney, Agent, or Firm* — Hewlett-Packard Patent Department; Adam Franks

(57) ABSTRACT

According to one example of the present invention, there is provided an image processor for generating data to control an inkjet printing system. The image processor comprises an image analyzer to identify within an image to be printed an area of substantially solid color and to define within the identified area a frame portion and an intra-frame portion, and a printer control data generator to generate printing system control data to cause a printing system to print a frame portion and an intra-frame portion of the identified area.

20 Claims, 4 Drawing Sheets

GENERATING CONTROL DATA TO PRINT A FRAME PORTION AND AN INTRA-FRAME PORTION

BACKGROUND

Drop-on-demand inkjet printing systems are widely used to produce high quality and low-cost printed images. Typical color inkjet printing systems use multiple colored inks such as cyan (C), magenta (M), yellow (Y), and black (K) in a so-called CMYK or 4 color printing process. Some printing systems may use additional colored inks such as light cyan (c) and light magenta (m) in a so-called CcMmYK or 6 color printing process. Such inks may be generally referred to as base-color inks.

Some printing systems may also use additional 'specialty' inks, such as white, silver, and gold. White ink, for example, may be used when printing on transparent or colored substrates. Specialty inks may be used to print specific colors that are not achievable using the CMYK printing process.

Specialty inks may have technical characteristic which are different from typical base-color inks. Accordingly, printing with specialty inks may require applying different techniques compared to printing with more conventional base-color inks.

BRIEF DESCRIPTION

Examples, or embodiments, of the invention will now be described, by way of non-limiting example only, with reference to the accompanying drawings, in which.

DETAILED DESCRIPTION

Figure 1:
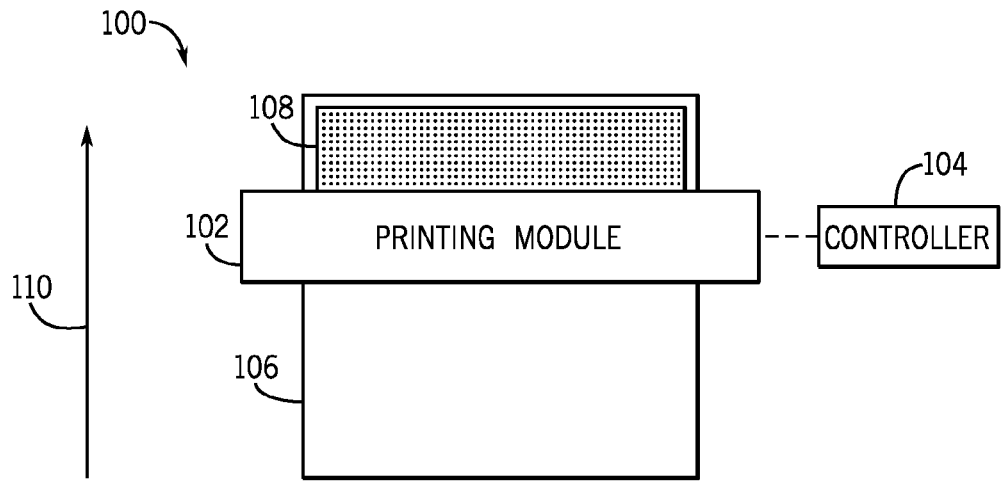
FIG. 1 is a simplified plan view illustration of a printing system according to one example.

Referring now to FIG. 1 there is shown a simplified plan view illustration of an inkjet printing system 100 according to one example. The printing system 100 comprises a printing module 102 configured to eject ink drops from one or multiple printheads (not shown) onto a substrate 106 to incrementally form a printed output 108. Operation of the printing system 100 is controlled by a printer controller 104.

The substrate 106 may be, for example, a sheet of substrate or a substrate supplied from a roll or web of substrate. The substrate may, in some examples, be supported by a substrate support (not shown).

The substrate 106 moves relative to the printing module 102 in the direction of printing 110. In one example the printing module 102 is configured to remain stationary (although printheads within the printing module 102 may or may not remain stationary) whilst the substrate 106 is moved in the printing direction 110.

In a further example the substrate 106 is configured to remain stationary whilst the printing module 102 moves contrary to the printing direction 110, for example on a moveable carriage (not shown). In both examples the printing system 100 operates under control of the printer controller 104 to incrementally form a printed image 108 on a substrate 106.

Figure 2:
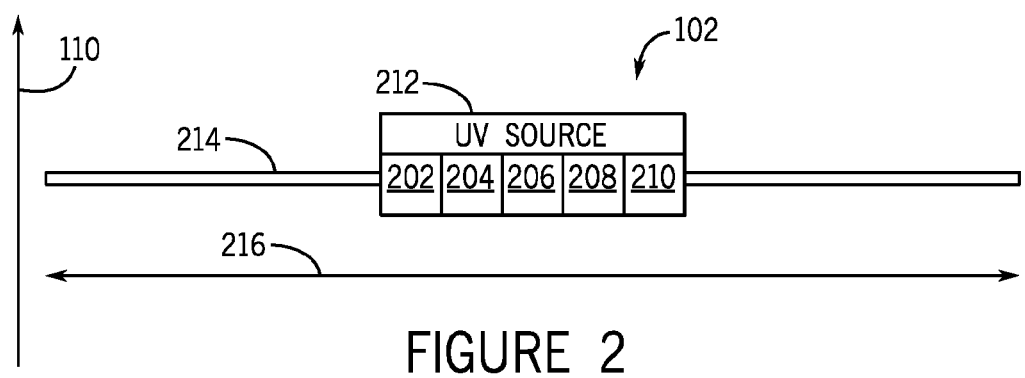
FIG. 2 is a simplified functional illustration of a printing module of a printing system according to one example.

In the present example, as illustrated in FIG. 2, the printing module 102 is configured to print using curable inks, such as ultra-violet (UV) curable inks. UV curable inks are exposed to UV radiation once they have been deposited by a printhead on a substrate to cause the ink to transform from a liquid to a solid.

The printing module 102 comprises a number of inkjet printheads 202, 204, 206, 208, and 210. In one example printheads 202, 204, 206, and 208 may be configured to respectively eject ink drops of cyan, magenta, yellow, and black ink. Printhead 210 may be configured to eject ink drops of a specialty ink, such as a white ink.

A UV radiation source 212 is located in proximity to the printheads 202 to 210 and is controllable by the printer controller 104 to emit UV radiation such that UV curable ink is cured on a substrate within a short delay (typically in the order of less than a few seconds) after having been deposited on a substrate. This is commonly referred to as in-line curing. In other examples one or multiple UV radiation sources may be located separately from the printing module 102.

In this example the printheads 202 to 210, along with the UV source 212, are mounted on a carriage (not shown) that is moveable along a carriage bar 214 along a scanning axis 216. The scanning axis 216 is substantially perpendicular to the direction of printing 110.

The term 'curing' when used herein with reference to UV curable inks will be understood to mean applying sufficient UV radiation to substantially cure ink deposited on a substrate such that no further UV radiation need be applied to the deposited ink in order to substantially solidify a UV curable ink.

In some examples, however, UV curable ink may be 'pinned' by applying a smaller dose of UV radiation than is required to substantially cure a UV curable ink. Pinning prevents bleeding between different colored UV curable inks, but does not completely solidify or consolidate a UV curable ink. Pinning does, however, enable lower power UV radiation sources to be used in or in proximity to the printing module. When using pinning additional UV radiation sources may be used to substantially cure the ink. In one example the additional UV radiation sources may be provided by an off-line curing module (not shown). In some examples in-line pinning of a UV ink may be performed in place of in-line curing, and a subsequent off-line curing process performed.

Figure 3:
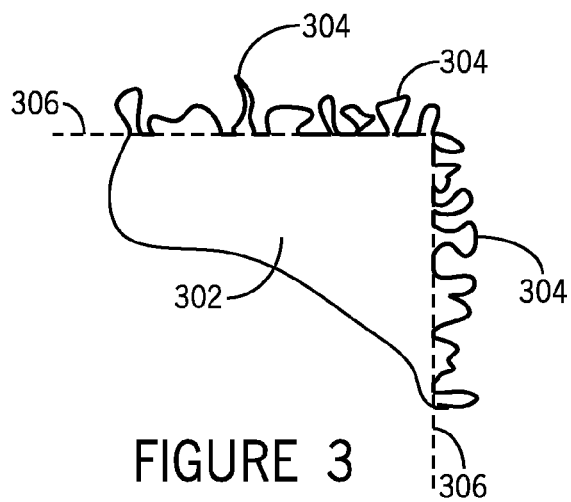
FIG. 3 is an illustration of edge artifacts in a portion of a printed image.

When printing using certain kinds of inks on certain kinds of substrates ink deposited on a substrate may spread and flow in an undesirable manner leading to irregular edges or edge artifacts being observable in a printed image. This may occur, for example, when using UV curable white inks when printing on non-absorbent substrates such as plastics or glass. An illustration of this is shown in FIG. 3. FIG. 3 shows a portion of a printed area 302 printed on a substrate such as substrate 106. A number of edge artifacts 304 are shown that extend in a generally undesirable manner beyond desired edges 306 of the printed area. The presence of such artifacts reduces the printed edge density and may lead to the edges of the printed area 302 appearing blurred or irregular.

Such artifacts may be particularly problematic and undesirable when printing large areas of substantially solid colors, such as, for example, when printing a white background using substantially only white ink on a transparent or colored substrate on which a later image is to be printed. When printing such areas a large amount of ink may be deposited, for example, in one or multiple print passes, to ensure sufficient opacity of the printed area.

It has been observed that the edge artifacts 304 may be present when printing large areas even when in-line UV curing is performed.

Accordingly, examples of the present invention aim to improve the quality of edges of printed areas.

A number of Examples will now be described below with additional reference to FIGS. 4, 5, and 6.

Figure 4A:
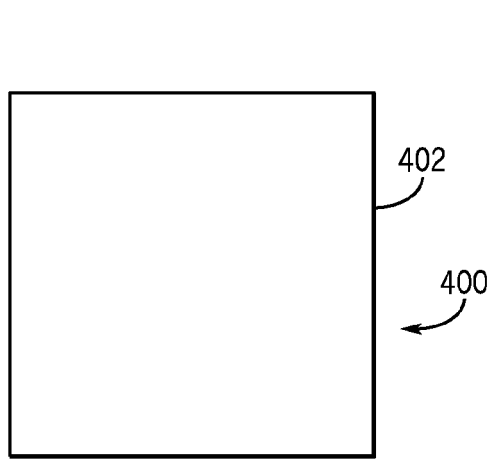
FIG. 4a is an illustration of an image to be printed.

Referring now to FIG. 4a there is shown an area 400 to be printed. In the present example the image 400 is an area of substantially solid color. The edge of the area 400 is shown by a border 402. In one example the image 400 is to be printed using a white ink, although in other examples the image 400 may be printed using one or multiple color inks. The area 400 may be a complete image to be printed, or may be an area of a larger image. Although shown in FIG. 4 as being a regular polygon, in other examples the area 400 may be any regular or irregular shape.

In the present example the image 400 is described in an image file comprising image data. The image file and image data may be in any suitable format.

To print the image 400 in accordance with an example, the image 400 is processed by an image processing module 500. The image processing module 500 comprises an image analyzer 502, and a printer control data generator 503. The printer control data generator 503 comprises a printhead control data generator 504 and a curing module control data generator 506. In one example the image processing module 500 is independent from the printing system 100 and may be provided, for example, in a raster image processor (RIP), or in any other suitable pre-printing processor. In a further example, the image processing module 500 is provided within the printing system 100, and may, for example, be provided by the printing system controller 104.

The image processor 500 generates printhead control data and curing module control data that may be used by a printing system to enable the image 400 to be printed and cured in such a way that edge artifacts 304 are substantially reduced or eliminated, as described below.

Figure 6:
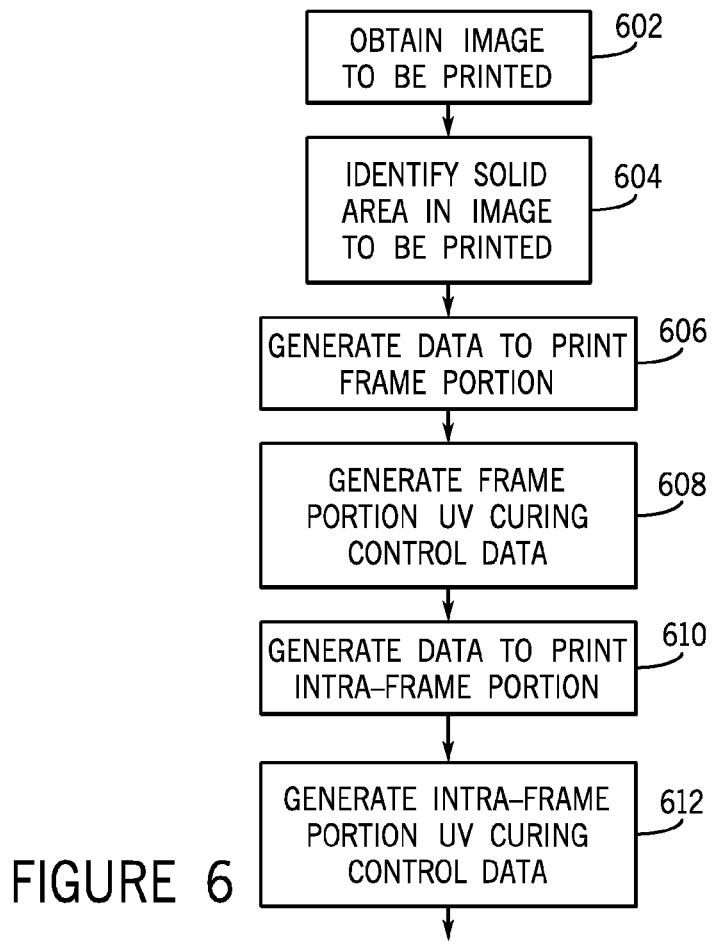
FIG. 6 is a flow diagram outlining an example method of operating an image processor according to one example.

Operation of the image processor 500 is described additionally with reference to the flow diagram of FIG. 6.

The image 400 to be printed is obtained (block 602, FIG. 6) in any suitable manner by the image analyzer 502. The image analyzer 502 analyzes the obtained image 402 to identify (block 604, FIG. 6) an area of solid or of substantially solid color in the image. By solid color is meant an area formed entirely, or substantially entirely, of a single color. In the present example the obtained image is an image of a solid color area, such as an area of white color. In other examples, the obtained image may comprise multiple areas of solid color.

Figure 4B:
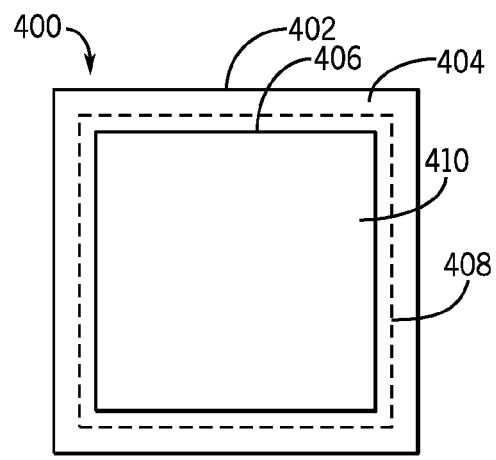
FIG. 4b is an illustration of an image to be printed divided into a frame portion and intra-frame portion according to one example.
Figure 5:
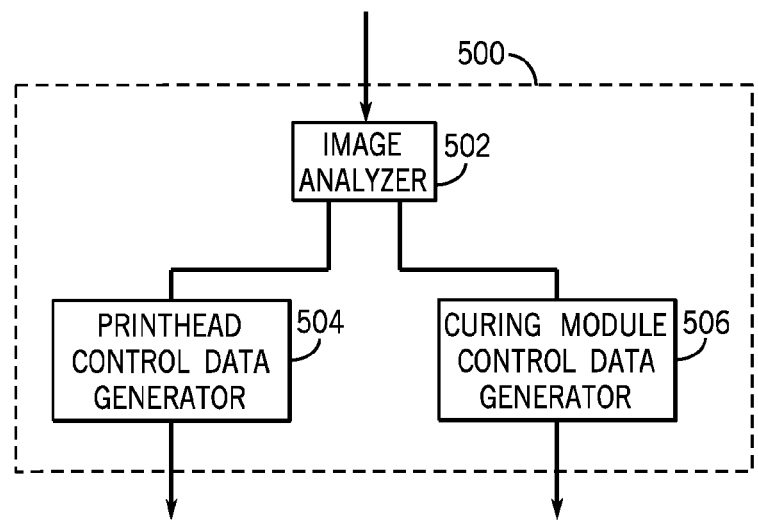
FIG. 5 is simplified block diagram of an image processor according to one example.

When an area of solid color is identified the image analyzer 502 splits the area into two portions, as illustrated in FIG. 4b to define a frame portion 404 and an intra-frame portion 410. The frame portion 404 is delimited by the outer boundary 402 of the identified area, and an inner boundary 406. The intra-frame portion 410 is delimited by an intra-frame boundary 408. Although shown as being a regular polygon, in other examples the area 400 may be any regular or irregular shape.

The identification of the frame portion and intra-frame portion may be achieved using any known image analysis techniques.

In the present example the frame portion 404 is determined to have a substantially uniform width in the range of 1 to 10 ink drops. In other examples a different width frame portion may be chosen.

In one example the intra-frame boundary 408 is determined to overlap the frame portion 404 by a predetermined amount. In one example the predetermined amount is in the range of about 1 to 6 ink drops, however in other examples other predetermined amounts of overlap may be used. An amount of overlap is useful when the frame portion is printed after the intra-frame portion. In one example the frame portion 404 and intra-frame portion 410 are arranged not to overlap. No overlap may be useful when the frame portion is printed before the intra-frame portion.

At block 606 the image processor 500 generates, using a printhead control data generator 504, data suitable for controlling a printhead in a printing system to print the frame portion 404 of the image 400. At block 608 the image processor generates, using a curing module data generator 506, data suitable for controlling a curing source, such as the UV source 212, to cure ink drops deposited by a printing system when printing the frame portion 404.

At block 610 the image processor 500 generates, using the printhead control data generator 504, data suitable for controlling a printhead in a printing system to print the intra-frame portion 410 of the image 400. At block 612 the image processor generates, using the curing module data generator 506, data suitable for controlling the curing source, to cure ink drops deposited by a printing system when printing the intra-frame portion 410.

In one example the image processor 500 generates data such that the frame portion 404 is cured substantially in-line. In other words, that ink drops deposited by a printing system when printing the frame portion 404 are cured within a short delay (for example in the order of about 0.1 to 2 seconds) after they are deposited on a substrate. The delay between printing and curing may be adapted based on print speed and/or substrate movement speed.

In one example the image processor 500 generates data such that the intra-frame portion 404 are not cured substantially in-line. In other words, that ink drops deposited by a printing system when printing the intra-frame portion 404 are cured with a longer delay (for example in the order of about 5 to 280 seconds) after they are deposited on a substrate. Use of a longer delay before curing when printing the intra-frame portion 404 may enable, for example, the deposited ink drops to settle prior to curing being performed. This may further enable the printed intra-frame portion 404 to exhibit higher gloss and increased surface uniformity compared to performing the curing substantially in-line. In other examples longer or shorter delays may be used based on specific circumstances.

Once the printhead control data and curing module control data has been generated a printing system may be controlled to print the image 400. In one example the image processor 500 sends generated control data to a printing system to cause the printing system to print the defined frame and intra-frame portions. In a further example the control data generated by the image processor 500 may be obtained, for example, by a printing system controller, such as the controller 104, which may then control a printing system to print the defined frame and intra-frame portions.

Figure 7:
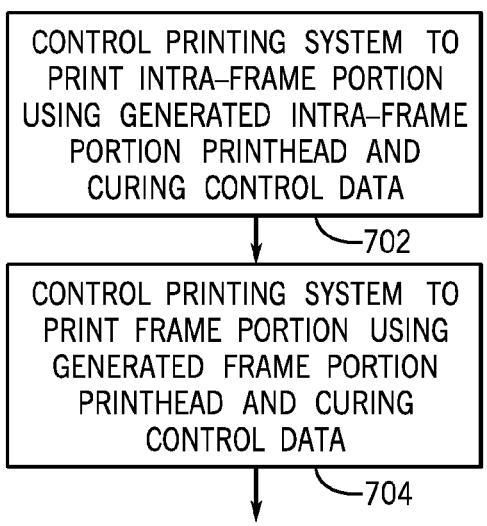
FIG. 7 is a flow diagram outlining an example method of operating a printing system according to one example.

In one example a printing system may be controlled (block 702), as shown in the flow diagram on FIG. 7 to initially print an intra-frame portion using generated infra-frame portion printhead control data and to control a printing system curing module to cure the printed-intra-frame portion using generated intra-frame portion curing control data. The printing system is then controlled (block 704) to print a frame portion using generated frame portion printhead control data and to control the printing system curing module to cure the printed frame portion using generated frame portion curing control data.

Figure 9:
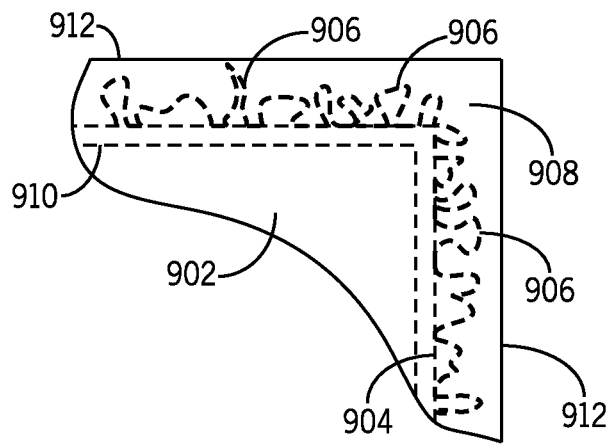
FIG. 9 is an illustration of a portion of an image printed according to one example.

An illustration of a portion of an image printed in this manner is shown in FIG. 9. As can be seen the initially printed intra-frame portion 902 (bounded by desired edge 904) exhibits edge artifacts 906, as previously described. However, once the intra-frame portion 902 has been printed and cured, the printing and substantial in-line curing of the frame portion 908 (bounded by desired edge 912 and edge 910) effectively masks any such edge artifacts leading to a clean and sharp image edge 912. It should be noted that the edge 910 of the frame portion 902 overlaps the desired edge 904 of the intra-frame portion 902.

Figure 8:
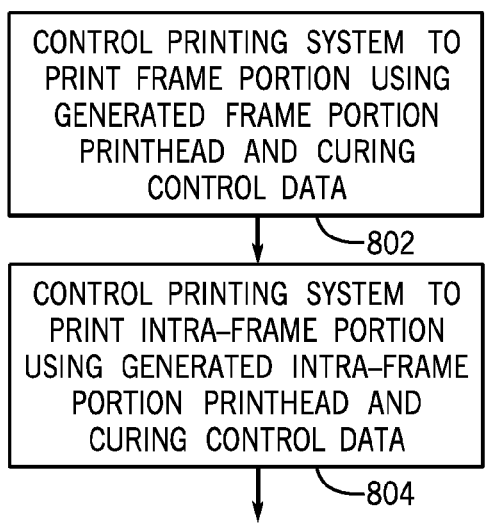
FIG. 8 is a flow diagram outlining an example method of operating a printing system according to one example.

In a further example a printing system may be controlled (block 802), as shown in the flow diagram on FIG. 8 to initially print a frame portion using generated frame portion printhead control data and to control the printing system curing module to cure the printed frame portion using generated frame portion curing control data. The printing system is then controlled (804) to print an intra-frame portion using generated infra-frame portion printhead control data and to control a printing system curing module to cure the printed-intra-frame portion using generated intra-frame portion curing control data.

Figure 10:
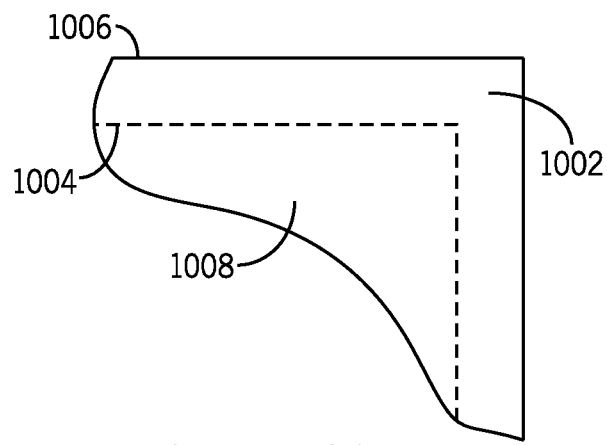
FIG. 10 is an illustration of a portion of an image printed according to one example.

An illustration of a portion of an image printed in this manner is shown in FIG. 10. As can be seen, the initially printed and substantially in-line cured frame portion 1002 acts as an effective barrier to the ink used in printing the intra-frame portion 1008, thereby preventing edge artifacts from the intra-frame portion from forming. The edge 1006 or the frame portion 1002 does not exhibit noticeable edge artifacts since the amount of ink used in printing the frame portion (due to the small width of the frame portion) is low. It should be noted that in this example the frame portion 1002 and intra-frame portion 1008 do not overlap, but are arranged so that the intra-frame portion 1008 abuts the frame portion 1002.

In all cases, the examples described herein enable an image or image area to be printed with clean and sharp edges, free, or substantially free, of edge artifacts.

It will be appreciated that examples and embodiments of the present invention can be realized in the form of hardware, software or a combination of hardware and software. As described above, any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples of the present invention. Examples of the present invention may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. An image processor for generating data to control an inkjet printing system comprising:
   an image analyzer to identify within an image to be printed an area of substantially solid color and to define within the identified area a frame portion and an intra-frame portion, wherein the frame portion surrounds the intra-frame portion;
   a printer control data generator to generate printing system control data to cause the inkjet printing system to print the frame portion and the intra-frame portion of the identified area; and
   a curing module control data generator to generate curing module control data to cause a curing module of the inkjet printing system to cure first ink in the frame portion using a first curing technique, and cure second ink in the intra-frame portion of the identified area using a second, different curing technique.

2. The image processor of claim 1, wherein the image analyzer is configured to define the frame portion of the identified area to have a width of between 1 and 10 ink drops.

3. The image processor claim 1, wherein the image analyzer is configured to define the frame portion to overlap the intra-frame portion by between 0 and 6 ink drops.

4. The image processor of claim 1, further configured to send the generated printing system control data to the inkjet printing system to cause the inkjet printing system to print the identified area in accordance with the generated printing system control data.

5. The image processor of claim 4, further configured to send the generated printing system control data to the inkjet printing system to cause the inkjet printing system to print the intra-frame portion before printing the frame portion.

6. The image processor of claim 4, further configured to send the generated printing system control data to the inkjet printing system to cause the inkjet printing system to print the frame portion before printing the intra-frame portion.

7. The image processor of claim 1 configured to identify the area of substantially solid color as an area of white ink.

8. The image processor of claim 1, wherein the printing system control data is to cause the inkjet printing system to print one of the frame portion and the intra-frame portion before printing another one of the frame portion and the intra-frame portion.

9. The image processor of claim 1, wherein:
   the first curing technique cures the first ink in the frame portion a first delay after depositing the first ink in the frame portion, and the second curing technique cures the second ink in the intra-frame portion a second delay after depositing the second ink in the intra-frame portion, the second delay different from the first delay.

10. The image processor of claim 9, wherein the second delay is larger than the first delay.

11. The image processor of claim 1, wherein the frame portion completely extends around a boundary surrounding the intra-frame portion.

12. A printing system comprising:
  a printhead for ejecting drops of a ultra-violet (UV) curable ink;
  at least one UV source for curing ejected ink drops; and
  an image processor comprising:
    an image analyzer to identify within an image to be printed an area of substantially solid color and to define within the identified area a frame portion and an intra-frame portion, wherein the frame portion surrounds the intra-frame portion;
    a printer control data generator to generate printing system control data to cause the printing system to print the frame portion and the intra-frame portion of the identified area; and
    a curing module control data generator to generate curing module control data to cause the at least one UV source to cure first ink drops in the frame portion using a first curing technique, and cure second ink drops in the intra-frame portion of the identified area using a second, different curing technique.

13. The printing system of claim 12, wherein the printing system control data is to cause the printhead to print one of the frame portion and the intra-frame portion before printing the other one of the frame portion and the intra-frame portion.

14. The printing system of claim 13, wherein the printing system control data is to cause the printhead to print the frame portion before the intra-frame portion.

15. The printing system of claim 13, wherein the printing system control data is to cause the printhead to print the intra-frame portion before the frame portion.

16. The printing system of claim 12, wherein:
  the first curing technique cures the first ink drops in the frame portion a first delay after depositing the first ink drops in the frame portion, and
  the second curing technique cures the second ink drops in the intra-frame portion a second delay after depositing the second ink drops in the intra-frame portion, the second delay being different from the first delay.

17. The printing system of claim 16, wherein the second delay is larger than the first delay.

18. The printing system of claim 12, wherein using the first curing technique to cure the first ink drops in the frame portion reduces artifacts in an edge portion of the image to be printed.

19. A non-transitory machine-readable storage medium storing instructions that upon execution cause a system to:
  identify within an image to be printed an area of substantially solid color and to define within the identified area a frame portion and an intra-frame portion, wherein the frame portion surrounds the intra-frame portion;
  generate printer control data to cause an inkjet printer to print the frame portion and the intra-frame portion of the identified area; and
  generate curing module control data to cause a curing module of the inkjet printer to cure first ink in the frame portion using a first curing technique, and cure second ink in the intra-frame portion of the identified area using a second, different curing technique.

20. The non-transitory machine-readable storage medium of claim 19, wherein:
  the first curing technique cures the first ink in the frame portion a first delay after depositing the first ink in the frame portion, and
  the second curing technique cures the second ink in the intra-frame portion a second delay after depositing the second ink in the intra-frame portion, the second delay different from the first delay.

* * * * *

UNITED STATES PATENT AND TRADEMARK OFFICE
CERTIFICATE OF CORRECTION

| | | |
|---|---|---|
| PATENT NO. | : 8,931,866 B2 | Page 1 of 1 |
| APPLICATION NO. | : 13/349911 | |
| DATED | : January 13, 2015 | |
| INVENTOR(S) | : Ran Vilk et al. | |

It is certified that error appears in the above-identified patent and that said Letters Patent is hereby corrected as shown below:

In the Claims

In column 6, line 36, in Claim 3, delete "processor claim" and insert -- processor of claim --, therefor.

Signed and Sealed this
Tenth Day of May, 2016

Michelle K. Lee
*Director of the United States Patent and Trademark Office*